US006840992B2

(12) United States Patent
Glaum et al.

(10) Patent No.: US 6,840,992 B2
(45) Date of Patent: Jan. 11, 2005

(54) COATINGS FOR INKJET MEDIA

(75) Inventors: Holger Glaum, Maintal (DE); Astrid Mueller, Moembris (DE)

(73) Assignee: Degussa AG, Duesseldorf (DE)

( * ) Notice: Subject to any disclaimer, the term of this patent is extended or adjusted under 35 U.S.C. 154(b) by 330 days.

(21) Appl. No.: 09/829,943

(22) Filed: Apr. 11, 2001

(65) Prior Publication Data

US 2002/0040661 A1 Apr. 11, 2002

(30) Foreign Application Priority Data

Apr. 11, 2000 (EP) ............................................ 00107733

(51) Int. Cl.[7] ............................ B41M 5/00; C08K 5/54; C08L 29/04; C09J 101/00; C09J 103/00

(52) U.S. Cl. .................. 106/204.01; 106/720; 106/804; 106/805; 106/204.03; 106/217.01; 106/217.2; 106/217.3; 106/287.17; 106/287.18; 106/287.34; 106/287.35; 524/267; 524/268; 524/261; 524/557; 428/32.1; 428/32.11; 428/32.16; 428/32.17; 428/32.21; 428/32.28; 428/32.34; 428/32.36; 428/32.37; 428/32.38

(58) Field of Search ................................ 106/720, 804, 106/805, 204.01, 204.03, 217.01, 217.2, 217.3, 287.17, 287.18, 287.34, 287.35; 524/267, 268, 261, 557; 428/32.1, 32.11, 32.16, 32.17, 32.21, 32.28, 32.34, 32.36, 32.37, 32.38

(56) References Cited

U.S. PATENT DOCUMENTS

| | | | | | |
|---|---|---|---|---|---|
| 3,830,738 | A | | 8/1974 | Cottrell | |
| 4,138,527 | A | * | 2/1979 | Malek | 428/352 |
| 4,208,316 | A | | 6/1980 | Nauroth et al. | |
| 4,273,589 | A | | 6/1981 | Nauroth et al. | |
| 4,274,883 | A | * | 6/1981 | Lumbeck et al. | 106/490 |
| 4,824,789 | A | * | 4/1989 | Yafuso et al. | 436/68 |
| 5,106,675 | A | * | 4/1992 | Ara et al. | 428/219 |
| 5,213,846 | A | * | 5/1993 | Tsuneta et al. | 427/386 |
| 5,387,364 | A | * | 2/1995 | Nedelec et al. | 510/466 |
| 5,486,306 | A | * | 1/1996 | L'Hostis et al. | 516/117 |
| 5,686,054 | A | | 11/1997 | Barthel et al. | |
| 5,851,715 | A | | 12/1998 | Barthel et al. | |
| 5,998,536 | A | * | 12/1999 | Bertry et al. | 524/557 |
| 6,025,107 | A | * | 2/2000 | Sekiguchi et al. | 430/108.4 |
| 6,191,122 | B1 | * | 2/2001 | Lux et al. | 514/122 |
| 6,270,855 | B1 | * | 8/2001 | Jung et al. | 427/486 |

FOREIGN PATENT DOCUMENTS

| | | |
|---|---|---|
| DE | 2 107 082 | 8/1971 |
| DE | 26 28 975 C2 | 12/1975 |
| DE | 27 29 244 C2 | 1/1979 |
| DE | 44 19 234 A1 | 12/1995 |
| JP | 62-224580 | 11/1985 |
| JP | 62-178384 | 8/1987 |

OTHER PUBLICATIONS

"Inkjet Printer Gijutsu to Zairyo"; Technology of Inkjet Printer and Materials therefor; K.K. CMC, Jul. 31, 1998, First Edition, pp. 53–62 (Partial English Translation).

* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

The present invention provides a coating for inkjet media, which includes at least one hydrophobic filler particle; and a binder. Another embodiment of the invention provides an inkjet media, which includes the above-described coating coated on a substrate. Another embodiment of the invention provides a method of inkjet printing, which includes inkjet printing at least one inkjet ink onto a substrate coated with the above-described coating.

39 Claims, No Drawings

COATINGS FOR INKJET MEDIA

BACKGROUND OF THE INVENTION

1. Field of the Invention

The invention relates to coatings for inkjet media such as, for example, paper, films and textiles, and their use in the production and finishing of inkjet media.

2. Discussion of the Background

Inkjet media are media used for printing with inkjet printers. In the paper industry, fillers are required which, for example, absorb the ink well in inkjet media ad maintain the brilliance of the colors. In order to increase the printing speed and reduce the print dot size in inkjet printing, rapid drying is indispensable.

In the paper and films industry, attempts have been made for some time to formulate water-resistant inkjet media and therefore to protect them by variations in, for example, the binders, or to make the media hydrophobic and fix the color by subsequent application of a film, coating or lamination.

The known results of the above attempts have the following disadvantages:

They are cost-intensive.

An additional production step is necessary.

Intensive development work is necessary in the preliminary field.

The brush-on paints must be formulated with additional components, such as cationic additives.

The inks are not adequately fixed.

Accordingly, the need still remains for brush-on paints for inkjet media which avoid the aforementioned problems associated with conventional applications.

SUMMARY OF THE INVENTION

It is an object of the present invention to provide coatings for inkjet media.

It is another object of the present invention to provide coatings for inkjet media which increase the water-resistance of the media.

It is another object of the present invention to provide coatings for inkjet media which allow better fixing of the anionic inks.

It is another object of the present invention to provide coatings for inkjet media which show an increase in the print quality.

It is another object of the present invention to provide coatings for inkjet media which have the effect of fixing of the inks/dyestuffs in the upper brushed-on layer.

It is another object of the present invention to provide coatings for inkjet media which show a reduction in bleeding.

It is another object of the present invention to provide coatings for inkjet media which have a combination of additive properties and pigment properties.

These objects and others may be accomplished with the present invention, the first embodiment of which provides a coating for inkjet media, which includes:

at least one hydrophobic filler; and a binder.

Another embodiment of the invention provides an inkjet media, which includes the above-described coating coated on a substrate.

Another embodiment of the invention provides a method of inkjet printing, which includes inkjet printing at least one inkjet ink onto a substrate coated with the above-described coating.

Another embodiment of the invention provides a coating composition, which includes:

a hydrophobic filler that includes at least one filler particle and a means for making the particle hydrophobic; and a means for binding said hydrophobic filler.

Another embodiment of the invention provides an inkjet media, which includes:

(a) a coating composition, which includes:

(i) a hydrophobic filler which includes at least one filler particle and a means for making the particle hydrophobic, and (ii) a means for binding said hydrophobic filler; and (b) a means for supporting the coating composition in contact with the coating composition.

Another embodiment of the invention provides a method for inkjet printing, which includes a step for inkjet printing onto an inkjet media, which includes:

(a) a coating composition, which includes:

(i) a hydrophobic filler which includes at least one filler particle and a means for making the particle hydrophobic, and (ii) a means for binding said hydrophobic filler; and (b) a means for supporting the coating composition in contact with the coating composition.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the coating is in the form of a brush-on paint. The coating may be preferably applied to a substrate, if desired, by brushing on, spraying, doctor blading, or any other known method for coating substrates.

The invention provides coatings for inkjet media, which are characterized in that they include a binder and at least one hydrophobic filler. Preferably, the hydrophobic fillers are surface treated such that they are hydrophobic. Preferable fillers include silicas such as colloidal silica, silica gel, precipitated silica, pyrogenic silica; silicates such as calcium silicate, aluminum silicate, sodium aluminum silicate, aluminum polysilicate; naturally occurring and/or synthetic pigments such as aluminum oxide, clays, benthonite, calcined clay, precipitated calcium carbonate, mica, montmorillonite, kaolinite, asbestos, talc, diatomaceous earth, vermiculite, natural and synthetic zeolites, cement, alumina silica gels and glass. Combinations of fillers are possible.

More preferably, the filler is selected from the group including silicas such as colloidal silica, silica gel, precipitated silica, pyrogenic silica and silicates such as calcium silicate, aluminum silicate, sodium aluminum silicate and aluminum polysilicate.

More particularly preferably, the filler is selected from the group including silicas such as colloidal silica, silica gel, precipitated silica and pyrogenic silica.

Most preferably, the filler is selected from the group including precipitated silica and pyrogenic silica.

Preferably, surface-treated silicas, such as, for example, cationized and silanized silicas, can be employed.

Preferably, the hydrophobic filler is selected from the group including surface-treated silica, cationized silica, and silanized silica, and combinations thereof. The term, "cationized" means hydrophobic silica obtained by coating with silicon oil which preferably contains cationic groups such as quaternary ammonium groups.

Preferably, the hydrophobic filler has a carbon content of 0.1 to 5% by weight, based on the weight of the hydrophobic filler, and more preferably 0.5 to 2.5% by weight. These ranges include all values and subranges therebetween, including 0.2, 0.3, 0.4, 0.6, 0.7, 0.8, 0.9, 1, 2, 3, 4 and 4.5% by weight, based on the total weight of the hydrophobic filler.

Preferably, the hydrophobic filler has a DBP uptake of 50–350 g/100 g and more preferably 150–280 g/100 g. These ranges include all values and subranges therebetween, including 55, 75, 100, 125, 175, 225, 250, 275, 300 and 325 g/100 g.

Preferably, the hydrophobic filler has a surface area of 50–800 $m^2/g$ and more preferably 150–700 $m^2/g$. These ranges include all values and subranges therebetween, including 75, 100, 200, 300, 400, 500, 600 and 675 $m^2/g$.

Preferably, the hydrophobic filler has a particle size of less than 15 μm, more preferably 5–12 μm, and most preferably (for pyrogenic silicas) 2–200 nm. In the case of pyrogenic silicas, these figures relate to the primary particle size. These ranges include all values and subranges therebetween, including 4, 10, 25, 50, 75, 100, 125, and 175 nm, and 1, 2,3,4,6,7,8,9,10 and 11 μm.

The filler may be a precipitated silica which has been treated with a water-repellent agent after its production and/or also during its production.

Precipitated silicas are known from Ullmanns Enzyklop ädie der technischen Chemie, 4th edition, volume 21, pages 458 to 473 (1988), the entire contents of which is hereby incorporated by reference.

The production of fully hydrophobic silicas is, for example, known from DE 44 19 234 Al, DE-C 27 29 244, DE 26 28 975 C2 and DE-OS 21 07 082, the relevant contents of which are hereby incorporated by reference. DE 26 28 975 C2 and DE-C 27 29 244 relate to fully hydrophobic precipitated silicas. The two other patent specifications or unexamined German publications relate to fully hydrophobic and partially hydrophobic pyrogenic silicas. Other preferred hydrophobic precipitated silicas are described in, e.g., U.S. Pat. No. 6,191,122, the entire contents of which are hereby incorporated by reference.

In a preferred embodiment, the hydrophobic precipitated silica useful for the invention can include 85 to 98% by weight of precipitated silica and 15 to 2% by weight of surface treatment agent (preferably silicon oil having a carbon content of 32.4%). To obtain the desired degree of water-repellence, it can be prepared by mixing the requisite amount of water-repellent agent using high shearing forces with precipitated silica suspension prepared using a known process according to a given ratio with very short residence time and low pH value, filtering off the water-repellent agent-containing precipitated silica suspension and washing this free of salt, drying the precipitated silica filter cake homogeneously mixed with water-repellent agent using a known process, providing thermic post-treatment or tempering and then carrying out mechanical or radiation milling.

It is preferable to mix silicon oil homogeneously using high shearing energy with a precipitated silica suspension produced using known processes, with or without addition of phase transmitters (e.g. wetting agents, emulsifiers).

The continuous shearing device is preferably an Ultra-Turrax, a Kothoff-Mischsirene or a Rheinhütte mixer. The precipitated silica suspension homogeneously mixed with water-repellent agent is preferably then separated using known filtration apparatuses (e.g. chamber filtration press, rotary filter) and the solid matter containing water-repellent agent is washed free of salt. In so doing, the water-repellent agent is entirely taken up by the precipitated silica filter cake. The filtrates yielded are no longer contaminated with organosilicon compounds, with the result that the measured TOC contents are<10 mg/l.

Especially preferred embodiments of the precipitated silica suspensions used to prepare the hydrophobic silicas in the coating include precipitated silicas A and B below, and are characterized by the following respective physical chemical material data:

Precipitated silica A (the substance data relate to a filtered, washed and dried precipitated silica sample, without added water-repellent agent):

| | |
|---|---|
| BET surface according to DIN 66131 | 150 ± 50 [$m^2/g$] |
| Mean size of primary particles from EM photos | 15–25 [nm] |
| Loss on drying according to DIN 55921 after 2 h at 105° C. | 2.5–4.5 [%] |
| Loss at red heat (related to the substance dried for 2 h at 105° C. according to DIN 55921) | 3 ± 0.5 [%] |
| pH value (in 5% aqueous dispersion according to DIN 53200) | 3.5–6.5 |
| Conductivity (in 4% aqueous dispersion) | <1000 [μS] |
| $SO_3$ content (related to the substance dried for 2 h at 105° C. according to DIN 55921) | 0.3 [%] |
| $Na_2O$ content (related to the substance dried for 2 h at 105° C. according to DIN 55921) | 0.3 [%] |

Precipitated silica B (the substance data relate to a filtered, crushed and dried precipitated silica, without added water-repellent agent):

| | |
|---|---|
| BET surface according to DIN 66131 | 300 ± 50 [$m^2/g$] |
| Mean size of primary particles from EM photos | 10–15 [nm] |
| Loss on drying according to DIN 55921 after 2 h at 105° C. | 2.5–4.5 [%] |
| Loss at red heat (related to the substance dried for 2 h at 105° C. according to DIN 55921) | 3 ± 0.5 [%] |
| pH value (in 5% aqueous dispersion according to DIN 53200) | 3.5–6.5 |
| Conductivity (in 4% aqueous dispersion) | <1000 [μS] |
| $SO_3$ content (related to the substance dried for 2 h at 105° C. according to DIN 55921) | 0.3 [%] |
| $Na_2O$ content (related to the substance dried for 2 h at 105° C. according to DIN 55921) | <0.3 [%] |

For hydrophobizing it is preferable to use silicon oil, which includes dimethylpolysiloxanes with a viscosity of 20 to 1000 mPas, preferably with 50 mPas as water-repellent agents. It is also preferable to use one or more of the following: $R_2R'Si$—, where R═$CH_3O$—, $C_2H_5O$—, Cl—, R'═$CH_3$—, $C_2H_5$—, HMDS (hexamethyl disilazane), octamethyl tetrasiloxane, D6, D8, $R_3Si$—$C_nH_{2n+1}$, where n=1–18, R═$CH_3O$—, $C_2H_5O$—, $C_3H_7$—O—, Cl—, more preferably trimethoxyoctylsilane, Si 116, polymethyl siloxanes, polymethyl siloxane emulsions, (trimethyloxyhexadecyl silane), aminopropyl silanes, vinyl silanes, methacrylic silanes. Combinations are possible.

The resultant precipitated silica filter cake homogeneously mixed with water-repellent agent is dried in the subsequent process step in known drying aggregates. The drying aggregate for drying the water-repellent agent-containing filter cake can be a band dryer or spin-flash dryer. To achieve the desired degree of water-repellence, the dry product containing water-repellent agent is subjected to thermic post-treatment at 300° C. to 400° C., preferably 350° C. for 30 to 60 minutes in a discontinuous, electrically heated stirrer container or in a continuous electrically heated double screw reactor thermally treated or tempered and then milled mechanically or using jet mills.

Another preferred embodiment for preparing the hydrophobic precipitated silica in the coating of the invention includes the following process of wet water-repellence.

A mass stream of 0.424 kg/h polymethyl siloxane is added using a continuous mixer with high shearing energy input to a mass stream of 160 kg/h of an aqueous precipitated silica suspension with a solids content of 85 g/l, that was prepared using known manufacturing processes, while maintaining a pH value of 3, the temperature of the two components to be mixed being 25±5° C. In so doing, the residence time in the mixer may not exceed 5 seconds. The command reference input for the coating process is taken to be the dimensionless coating index $B_i$ which describes the ratio to one another of the active substance portions of the two mass streams to be mixed. A coating index of 32 is needed to achieve the hydrophobic property of the precipitated silica of the invention.

Preferably, the precipitated silica coated with silicone oil is then separated using known processes without using a subsequent post-reaction time, washed almost free of electrolyte, dried at 105° C., tempered for 1.0 hour at 370° C. and then milled.

Preferably, the filler in the coating of the invention can be prepared in the mixer due in particular to the low pH value and the short residence time in the mixer.

The term, "hydrophobic" is well-known to those of skill in the art to which the invention pertains. Preferably, the hydrophobicity of the fillers in accordance with the invention may be defined by the carbon content of the silicon-coated filler or by methanol wettability.

Fillers, the surfaces of which are modified with non-hydrolyzable and/or ionic organic groups, are generally not wetted with water. These hydrophobic fillers can, however, be wetted using a methanol/water mixture. The proportion of methanol in this mixture—expressed in percent by weight—is a measure of the water-repellence of the modified filler. The higher the proportion of methanol, the more hydrophobic is the substance. Methods for determining the methanol wettability are known and described in, e.g., U.S. Pat. No. 6,191,122, the entire contents of which are hereby incorporated by reference.

Preferably, the methanol wettability of the hydrophobic fillers (and more preferably hydrophobic silicas) used in the present invention is 10–80%, and more preferably 10–49%. These ranges include all values and subranges therebetween, including 15, 20, 25, 30, 35, 40, 45, 50, 55, 60, 65, 70 and 75%.

The dibutylphthalate number (DBP number) is determined using a Brabender plastograph. The DBP number is a measure of the liquid absorbency or absorption capacity of a product in powder form. Absorption capacity depends on moisture content, on granulation and initial weight of the material investigated. In the present case, DBP number is a measure of the absorbency of the filler. DBP number is well-known to those in the art, and methods for determining DBP number are known and described in, e.g., U.S. Pat. No. 6,191,122, already incorporated by reference.

Methods of determining the particle size of the silica are known and described, e.g., in U.S. Pat. No. 6,191,122, already incorporated by reference.

Preferably, the coatings according to the invention have a solids content of between 2 and 40%, more preferably between 5 and 30%, and most preferably between 10 and 20%, which ranges include all values and subranges therebetween, including 3, 4, 9, 12, 14, 25 32 and 35.

Preferably, the coatings according to the present invention may be prepared by combining the filler with a binder, and more preferably with a solution of a water-soluble or water-dispersible polymer as binder. Other preferred binder polymers include polyamide, polyethyleneneimine, polyacrylamide, cationic-modified polyvinyl alcohol, polyvinyl alcohol, polyvinyl pyridine, amino-substituted polyacrylate, amino-substituted polyether, amino-substituted polyester, polyvinylpyrollidone, vinyl acetate, poly(m)ethacrylate, copolymers thereof, and combinations thereof. Most preferably, the binder is selected from the group including polyvinyl alcohol, polyvinylpyrollidone, vinyl acetate, starch, cellulose, latex, copolymers thereof, and combinations thereof. Most especially preferably, the binder is selected from the group including polyvinyl alcohol, polyvinylpyrollidone/vinyl acetate copolymer, and combinations thereof.

The method of preparing the coating is not particularly limited. Preferably, the hydrophobic filler is wetted or dispersed in either an aqueous solution, a mixture of one or more alcohols and water, or one or more alcohols, and the resulting solution or dispersion is combined with a solution or dispersion of the binder. Preferably, a mixture of alcohol and water is used for wetting or dispersing the hydrophobic filler. Preferably, ethanol or methanol is used in such a mixture. The thus obtained coating mixture is applied to a substrate and allowed to dry.

Preferably, the binder is present in the coating in an amount ranging from 10–90 parts by weight, based on 100 parts by weight of the dried coating. More preferably, the binder is present in an amount ranging from 20–80 parts by weight, more especially preferably 25–70 parts by weight, and most preferably 30–50 parts by weight. These ranges include all values and subranges therebetween, including 15, 22, 33, 35, 45, 55, 65, 75 and 85 parts by weight.

Another preferred embodiment of the invention provides an ink-jet media, which includes the coating in contact with a support. Preferred supports include plain paper, resin coated paper, cloth, wood, metal plates, films or sheets of polyester resins, diacetate resins, triacetate resins, acrylic resins, polycarbonate resins, polyvinyl chloride resins, polyimide resins. The support may be either transparent or opaque.

The ink for the inkjet printing is not particularly limited, and may be either a pigment-containing ink or a dye-containing ink. The ink may contain either an organic or aqueous solvent or a mixture of both.

Preferably, the support has a thickness of 50 to 500 $\mu$m, more preferably 75 to 300 $\mu$m.

The coatings according to the invention for inkjet media have the following advantages:

Increase in the water resistance

Increase in the fixing of the ink

Increase in the print quality

Fixing of the inks in the upper brushed-on layers

Combination of additive and pigment properties in one product

Increase in the color intensity

Increase in the point sharpness

The present invention thus allows for rapid uptake of the ink, improve the point sharpness and promote defined, circular spreading out of the ink drop. The present invention also prevents the ink from showing through or penetrating through, and it produces high color densities.

Compared with standard formulations, the coatings according to the invention, in particular those which include precipitated silicas, show advantages in the printed image, in particular in the point sharpness. They also have an improved water resistance.

EXAMPLES

Having generally described this invention, a further understanding can be obtained by reference to certain specific examples which are provided herein for purposes of illustration only and are not intended to be limiting unless otherwise specified.

Experimental Procedure/Method

Coatings based purely on silica with a solids content of 15% or also 20, 10 and 7% are formulated. The Brookfield viscosity is measured at 5, 10, 20, 50 and 100 rpm 7 days after preparation. The coatings prepared are brushed on to standard base paper, with subsequent drying and calendering of the paper specimens. The absorption properties of inkjet inks are measured according to test A, B and C and the print test is carried out by four-color and three-color printing by means of an HP Deskjet 550 C. The hydrophobic properties of the papers/prints are evaluated by means of the “water drop test”.

The overall evaluation includes the ease of incorporation, the brushing properties, the adhesion of the coating, the absorption properties, the printability and the hydrophobic properties.

To prepare the inkjet coatings of the examples, in particular the standard recipe, 30 parts PVA are initially introduced into the total amount of water and are dissolved at 95° C. The silica or the silica mixture (precipitated and pyrogenic silica) is subsequently incorporated at 1000 rpm and then dispersed at 3000 rpm for 30 minutes.

For incorporation of the silicas according to examples 1–8 into the aqueous system, the dissolved binder (37 parts PVA/3 parts PVP/VA) and the corresponding sample are introduced into a glass bottle and mixed with a Turbula mixer for ten minutes. The system is then transferred to a double-walled vessel and dispersed by means of a dissolver at 3000 rpm. The coatings formulated in this way include 100 parts silica, or silica mixture, and 37 parts polyvinyl alcohol (PVA), and 3 parts polyvinylpyrrolidone/vinyl acetate copolymer (PVP/VA), or 100 parts silica mixture and 30 parts PVA for the standard recipe.

Another possibility for the preparation of the coating includes wetting the silica and/or the hydrophobized pigment by means of a mixture of methanol and water and then stirring this into the binder solution.

In the Examples, additives and co-binders are not added to the coatings as is usual. The coating in the Examples recipe has not been optimized further for highly water-resistant properties. Coating recipes for various media are described, inter alia, in Technical Information No. 1212 of Degussa-Hüls, Business Unit FP, the entire contents of which are hereby incorporated by reference. The use according to the invention of the partly or highly hydrophobic silicas can be applied to other recipes.

The specimen is brushed sheet-wise (DIN A4) by means of a Dow Coater at 50 m/min. The papers dried in a Dow tunnel dryer are satinized at 9 bar/45° C. by means of a calender and used for the following tests.

For Test A 7.5 μl of each printing ink are applied to the substrate by means of an Eppendorf Variopet and left to dry. The drying properties are evaluated analogously to the evaluation table and the diameter is measured in mm.

For Test B

1 μl of each printing ink is applied to the substrate by means of a Hamilton microlitre pipette. The drying properties and the penetration properties are evaluated analogously to the evaluation table and the time taken for drying is measured in seconds.

For Test C

1 μl of each printing ink is applied to the medium by means of a Hamilton microlitre pipette. One minute thereafter the drop is distorted with a scoop spatula held at an angle of approx. 45° and the length is measured in mm.

The values determined in this manner give information on the absorption properties. The hydrophobic properties of the papers/prints are furthermore investigated with the aid of a “water drop test”:

60 μl portions of distilled water are introduced in each case on to an area printed in black and an area printed in color and left to act for 30 seconds. After careful dabbing off of the excess amount of water, the evaluation takes place. 60 μl are furthermore introduced on to a non-printed area and the paper is rotated slowly and continuously to 90° on a suitable substrate. The rolling-off properties of the drop and the possible running of color in contact with printed areas are evaluated.

The papers are printed by means of the HP 550 C in three-color and four-color printing mode.

The hydrophobic silicas according to examples 1, 2, 3, 6, 7 and 8 are known from the document EP 0 798 348 B1, the entire contents of which are hereby incorporated by reference.

The hydrophobic silicas according to examples 1, 3 and 7 and the hydrophobic silicas according to example 5 are commercial products which are described in the brochure “Fällungskieselsäuren und Silikate {Precipitated Silicas and Silicates}” of Degussa-Hüls AG, Business Unit Filler Systems and Pigments, the entire contents of which are hereby incorporated by reference.

TABLE 1

| | Sipernat C 600 Ex. 1 | Sipernat D 17 Ex. 5 | Ex. 6 | Ex. 2 | Sipernat C 630 Ex. 3 | Ex. 4 | Sipernat C 630/ MOX 170 Ex. 7 | MOX 170 Ex. 8 | Standard recipe Sip. 310/ MOX 170 |
|---|---|---|---|---|---|---|---|---|---|
| Batch no. | # 237 | # 235 | # 241 | # 229 | # 238 | # 231 | # 243 | # 242 | # 218 |
| Solids content in % | 12.5 | 15 | 10 | 15 | 10 | 7 | 12.5 | 20 | 15 |
| pH | 6 | 5 | 5.5 | 5.5 | 5.5 | 4.5 | 5.5 | 6 | 5.5 |

TABLE 1-continued

| | | Sipernat C 600 Ex. 1 | Sipernat D 17 Ex. 5 | Ex. 6 | Ex. 2 | Sipernat C 630 Ex. 3 | Ex. 4 | Sipernat C 630/ MOX 170 Ex. 7 | MOX 170 Ex. 8 | Standard recipe Sip. 310/ MOX 170 |
|---|---|---|---|---|---|---|---|---|---|---|
| | | | | | Viscosity, Brookfield after 7 days in mPa s | | | | | |
| after | 5 rpm | 580 | 1720 | 280 | 240 | 600 | 15120 | 1360 | 550 | 360 |
| stirring up | 10 rpm | 460 | 1180 | 200 | 220 | 410 | 6640 | 830 | 500 | 420 |
| | 20 rpm | 375 | 890 | 145 | 190 | 200 | 2820 | 530 | 490 | 385 |
| | 50 rpm | 305 | 210 | 110 | 175 | 190 | 1385 | 330 | 470 | 300 |
| | 100 rpm | 270 | 180 | 115 | 180 | 135 | 1110 | 240 | 460 | 250 |
| Surface area (m2/g) | | 160 | 100 | 200 | 100 | 160 | 170 | 650/170 | 600 | 650/170 |
| DBP uptake (g//100 g) | | 260 | 225 | 270 | 250 | 250 | — | — | 260 | — |
| Particle size (μm/nm) | | 4.5 μm | 10 μm | 5 μm | 10 μm | 7 μm | 12 nm | 7 μm/15 nm | 8 | 5.5 μm/15 nm |
| C content (%) | | 0.9 | 2.1 | 1.0 | 1.0 | 0.5 | 1.2–2.2 | — | 1.0 | 0.05 |
| Coating weight in g/m$^2$ | | 10.0 | 13 | 11 | 12 | 10 | 19 | 12 | 15 | 11 |
| Adhesion and smoothness of the coating | | adhesion poor, medium-rough | good, smooth | medium, smooth | good, smooth | medium, rough | good, rough, cloudy | scarcely any medium | very good, rough | good, smooth-medium |

Example 4 is prepared analogously to the standard recipe with 30 parts PVA to 100 parts pigment. 37 parts PVA and 3 parts VA/PVA are incorporated in the other examples.

No optimization to high solids contents was carried out, since initially only the effect of the pigments (silicas) on the water resistance was to be tested.

TABLE 2

| Test for determination of the absorption properties | | Sipernat C 600 Ex. 1 | Sipernat D 17 Ex. 5 | Ex. 6 | Ex. 2 | Sipernat C 630 Ex. 3 | Ex. 4 | Sipernat C 630/ MOX 170 Ex. 7 | MOX 170 Ex. 8 | Standard recipe Sip. 310/ MOX 170 |
|---|---|---|---|---|---|---|---|---|---|---|
| Batch no. | | # 237 | # 235 | # 241 | # 229 | # 238 | # 231 | # 243 | # 242 | # 218 |
| Diameter of | in mm | | | | | | | | | |
| dried drop - | K | 4 | 8 | 8 | 9 | 8 | 10 | 6 | 5 | 12 |
| Test A | CMY | 8 | 8 | 7 | 8 | 8 | 6 | 8 | 8 | 9 |
| Length of drawn-out | (longitudinal) in mm | | | | | | | | | |
| drop - | K | 41 | 8 | 10 | 24 | >240 | 15 | 100 | >250 | 5 |
| Test C | CMY | 26 | 10 | 40 | 30 | 42 | 15 | 60 | 40 | 14 |
| Drying | Evaluation | | | | | | | | | |
| properties/ | K | 4– | 3– | 2 | 2 | 6– | 4 | 3– | 4 | 2 |
| appearance | CMY | 3+ | 3– | 2 | 2– | 2– | 2– | 3– | 4 | 3 |
| Color intensity | Evaluation | II | II | II | II- | II- | II | | | II |
| Penetration Properties | Evaluation | – | ++ | 0 | 0– | 0– | 0+ | 0 | 0 | – |

Black = K
Magenta/yellow/cyan = CMY
The clear increase in the (drawn-out) drop length (test C) indicates the increase in the hydrophobic properties of the surface.

TABLE 3

| | Appearance of the drop and drying properties | | Color intensity | | Penetration properties |
|---|---|---|---|---|---|
| 1 | drop is uniformly absorbed immediately, even edges | I | strong, luminously clear color shades | ++ | no penetration through to the reverse of the paper |
| 2 | drop is uniformly absorbed immediately, frayed edges, slight blotting paper effect | II | strong, clear color shades | + | very slight penetration through to the reverse of the paper |
| 3 | drop initially remains on the paper in bead form, dries slowly, even edges | III | strong color shades with a slightly matted effect | 0 | moderated penetration through to the reverse of the paper |
| 4 | drop initially remains on the paper in bead form, dries slowly, frayed edges, slight blotting paper effect | IV | matt color shades | – | more severe penetration through to the reverse of the paper, reverse still dry |

TABLE 3-continued

| | Appearance of the drop and drying properties | | Color intensity | | Penetration properties |
|---|---|---|---|---|---|
| 5 | drop is absorbed uniformly, edges more severely frayed, blotting paper effect | V | very matt color shades, hardly any color intensity | – – | complete penetration through to the reverse of the paper, reverse damp to soaked through |
| 6 | drop is absorbed unevenly, edges more severely frayed, severe running of the ink in all levels | | | | |
| | | | the following parameters are additionally measured: | | |
| A | Diameter of the dried drop in mm | B | Time taken for drying in sec - the shorter the time, the better the drying | C | Length of the in mm after an action time of 1' (predrying) - the shorter the value in mm, the better the drying |

TABLE 4

Evaluation of the printing test by means of the HP 550 C Four-color printing

| | | Sipernat C 600 Ex. 1 | Sipernat D 17 Ex. 5 | Ex. 6 | Ex. 2 | Sipernat C 630 Ex. 3 | Ex. 4 | Sipernat C 630/ MOX 170 Ex. 7 | MOX 170 Ex. 8 | Standard recipe Sip. 310/ MOX 170 |
|---|---|---|---|---|---|---|---|---|---|---|
| Batch no. | | # 237 | # 235 | # 241 | # 229 | # 238 | # 231 | # 243 | # 242 | # 218 |
| Color intensity | magenta/ yellow/cyan | 1– | 3– | 3 | 1 | 2 | 1– | 2 | 4 | 2 |
| | black | 2 | 2 | 2– | 1 | 2– | 1– | 2 | 3 | 2 |
| Point sharpness | black in color | 2+ | 2+ | 2 | 1– | 2+ | 2+ | 2 | 3 | 3 |
| Transitions | color in color | 1– | 1– | 2 | 1– | 2+ | 2+ | 1 | 2– | 1 |
| Point | black print | 2 | 2 | 2– | 1 | 2– | 1– | 2 | 3 | 2 |
| sharpness | black contours | 1– | 2– | 2 | 1– | 2– | 1– | 2 | 3 | 3– |
| Half-shade | | 1 | 2– | 2 | 1– | 1 | 1 | 1 | 2– | 2+ |
| Total evaluation | | 11.25 | 15.75 | 15.5 | 9 | 14 | 10.5 | 12 | 21 | 16.75 |

TABLE 5

Three-color printing

| | | Sipernat C 600 Ex. 1 | Sipernat D 17 Ex. 5 | Ex. 6 | Ex. 2 | Sipernat C 630 Ex. 3 | Ex. 4 | Standard recipe Sip. 310/ MOX 170 | Sipernat C 630/ MOX 170 Ex. 7 | MOX 170 Ex. 8 |
|---|---|---|---|---|---|---|---|---|---|---|
| Batch no. | | # 237 | # 235 | # 241 | # 229 | # 238 | # 231 | # 218 | # 243 | # 242 |
| Color intensity | magenta/ yellow/cyan | 1– | 1 | 2+ | 1 | 2– | 2 | 3 | 2– | 3 |
| | black | 2– | 2+ | 2– | 2 | 2– | 2 | 2 | 2– | 3 |
| Point sharpness | black in color | 2+ | 2 | 2 | 1– | 1– | 1 | 1– | 2 | 2 |
| Transitions | color in color | 1– | 2– | 1– | 1– | 1 | 1 | 1 | 1 | 1 |
| Point | black print | 2– | 2+ | 2– | 2 | 2 | 2 | 3 | 2– | 3 |
| sharpness | black contours | 2 | 2+ | 2– | 2+ | 2+ | 2 | 2 | 2+ | 2 |
| Half-shade | | 3+ | 4 | 1– | 4 | 1 | 1 | 2 | 1 | 1 |
| Total evaluation | | 14.5 | 14.75 | 14.25 | 13.25 | 12.25 | 11 | 15.5 | 13.25 | 15 |

TABLE 6

Evaluation table for four-color printing (black and color)

| Color intensity | | | | Point sharpness | | |
|---|---|---|---|---|---|---|
| magenta/ yellow/cyan | black | Point sharpness black in color | Transitions color in color | black print | black contours | Half-tone print color intensity/contours |
| 1+ luminous, strongly intensive | 1 full color shade, strongly intensive | I clear separation, very good to good sharpness | 1 clear separation, clearly demarcated | 1 full color shade, strongly intensive | 1 clear separation, very good to good sharpness | 1 grey shade clear to the optimum, fine lines demarcated |
| 1 matt, strongly intensive | | 2 slight running, still good to moderate sharpness | 2 slight running, still good demarcation | | 2 slight running, still good to moderate sharpness | 2 grey shade blurred, fine lines demarcated |
| 2 matt, pale | | | 3 running, somewhat blurred | | | 3 grey shade clear to the optimum, fine lines blurred |
| 3+ luminous, spotted | 4 washed-out pale color shade | 4 bleeding, running, blurred | | 4 washed-out pale color shade | 4 bleeding, running, blurred | 4 grey shade blurred, fine lines blurred |
| 3 matt, spotted | | 5 severe running, scarcely readable | 5 severe running | | 5 severe running, scarcely readable | 5 grey shade dark to black, fine lines blurred |
| 3– strongly intensive, marbled | 6 very severely washed-out color shade and/or marbled | 6 very severe running, not sharp, unreadable | 6 very severe running of color, new color shades in the overlapping region | 6 very severely washed-out color shade and/or marbled | 6 very severe running in the area, not sharp, unreadable | 6 grey shade colored through black, fine lines scarcely detectable |
| 4 matt, marbled | | | | | | |
| 5 pale, marbled | | | | | | |
| 6 very matt a/o marbled | | | | | | |

TABLE 7

Evaluation table for three-color printing (all colored)

| Color intensity | | | | Point sharpness | | Half-tone print |
|---|---|---|---|---|---|---|
| magenta/ yellow/cyan | black | Point sharpness black in color | Transitions color in color | black print | black contours | color intensity/contours |
| 1+ luminous, strongly intensive | 1 full black color shade, strongly intensive | I clear separation, very good to good sharpness | 1 clear separation, clearly demarcated | 1 full black color shade, strongly intensive | 1 clear separation, very good to good sharpness | 1 grey shade clear to the optimum, fine lines demarcated |
| 1 matt, strongly intensive | | 2 slight running, still good to moderate sharpness | 2 slight running, still good demarcation | | 2 slight running, still good to moderate sharpness | 2 grey shade blurred, fine lines demarcated |
| 2 matt, pale | 3 washed-out, pale black color shade | | 3 running, somewhat blurred | 3 washed-out, pale, black color shade | | 3 grey shade clear to the optimum, fine lines blurred |
| 3+ luminous, spotted | 4 full olive-colored color shade, strongly intensive | 4 bleeding, running, blurred | | 4 full olive-colored color shade, strongly intensive | 4 bleeding, running, blurred | 4 grey shade blurred, fine lines blurred |

TABLE 7-continued

| Evaluation table for three-color printing (all colored) | | | | | | |
|---|---|---|---|---|---|---|
| Color intensity | | | | | | Half-tone print |
| magenta/ yellow/cyan | black | Point sharpness black in color | Transitions color in color | Point sharpness black print | Point sharpness black contours | color intensity/contours |
| 3 matt, spotted | | 5 severe running, scarcely readable | 5 severe running | | 5 severe running, scarcely readable | 5 grey shade olive, fine lines demarcated |
| 3– strongly intensive, marbled | 6 washed-out, pale, olive-colored color shade | 6 very severe running, not sharp, unreadable | 6 very severe running of color, new color shades in the overlapping region | 6 washed-out, pale olive-colored color shade | 6 very severe running in the area, not sharp, unreadable | 6 grey shade olive, fine lines blurred |
| 4 matt, marbled | | | | | | 6– grey shade colored through green, fine lines scarcely detectable |
| 5 pale, marbled | | | | | | |
| 6 very matt a/o marbled | | | | | | |

TABLE 8

Testing of the wettability of the printed and non-printed paper surfaces with water

| | Sipernat C 600 Ex. 1 # 237 | Sipernat D 17 Ex. 5 # 235 | Ex. 6 # 241 | Ex. 2 # 229 | Sipernat C 630 Ex. 3 # 238 | Ex. 4 # 231 | Sipernat C 630/ MOX 170 Ex. 7 # 243 | Ex. 8 # 242 | Standard recipe Sip. 310/ MOX 170 # 218 |
|---|---|---|---|---|---|---|---|---|---|
| Paper properties | very hydrophobic, water is not absorbed in | very hydrophobic, water is not absorbed in | very hydrophobic, water is absorbed in immediately | hydrophobic, water is not absorbed in | hydrophobic, water is not absorbed in | slightly hydrophobic, water is absorbed in | hydrophobic, water is not absorbed in | hydrophobic, water is not absorbed in | not hydrophobic, water is absorbed in |
| Drop flow properties | drop rolls off | drop rolls off | drop sticks | drop remains/ sticks on the paper | drop rolls off | drop remains/ sticks on the paper | drop sticks | drop rolls off | drop runs, is absorbed in |
| Color/ contour properties | colors bleed only slightly, contours remain very clear | colors bleed only slightly, contours remain | colors bleed only slightly, contours remain | colors bleed only slightly, contours remain very clear | colors bleed only slightly, contours remain | colors bleed only slightly, contours remain | colors bleed slightly, contours remain | colors bleed slightly, contours remain | colors bleed more severely, contours remain |

No additives or co-binders which have a more favorable effect on the water resistance are added to the coatings of the examples.

A good water resistance can be achieved by the use according to the invention of the silicas.

This effect can be optimized more by addition of further additives and binders.

Obviously, numerous modifications and variations of the present invention are possible in light of the above teachings. It is therefore to be understood that within the scope of the appended claims, the invention may be practiced otherwise than as specifically described herein.

This application is based on European patent application EP 00107733.8, filed Apr. 11, 2000, the entire contents of which are hereby incorporated by reference, the same as if set forth at length.

What is claimed is:

1. An inkjet coating composition, comprising;

at least one hydrophobic filler selected from the group consisting of a precipitated silica, a pyrogenic silica, a silicate or a synthetic pigment; and a binder;

wherein the hydrophobic filler has a carbon content of from 0.1 to 5% by weight.

2. The inkjet coating composition according to claim 1, wherein said hydrophobic filler is surface treated.

3. The inkjet coating composition according to claim 1, wherein said hydrophobic filler comprises at least one filler particle having a surface treated with at least one surface treating agent selected from the group consisting of silicon oil, dimethylpolysiloxanes, $R_2R'Si$—, hexamethyl disilazane, octamethyl tetrasilane, $R_3Si—C_nH_{2n+1}$, trimethoxy octylsilane, polymethyl siloxanes, polymethyl siloxane emulsions, trimethyloxyhexadecyl silane, aminopropylsilane, vinylsilane, methacrylic silane, and combinations thereof, wherein in the formulas above, R is independently $CH_3O$—, $C_2H_5O$—, $C_3H_7$—O—, or Cl—; R' is $CH_3$—, $C_2H_5$—; and n=1–18.

4. The inkjet coating composition according to claim 1, wherein said hydrophobic filler has a DBP uptake of 50–350 g/100 g.

5. The inkjet coating composition according to claim 1, wherein the hydrophobic filler has a methanol wettability of 10–80%.

6. The inkjet coating composition according to claim 1, wherein said hydrophobic filler has a surface area of 50–800 $m^2/g$.

7. The inkjet coating composition according to claim 1, wherein said hydrophobic filler has a particle size of less than 15 μm.

8. The inkjet coating composition according to claim 1, wherein said binder is a polymer selected from the group consisting of polyamide, polyethyleneneimine, polyacrylamide, cationic-modified polyvinyl alcohol, polyvinyl alcohol, polyvinyl pyridine, amino-substituted polyacrylate, amino-substituted polyether, amino-substituted polyester, polyvinylpyrollidone, vinyl acetate, poly(meth)acrylate, starch, cellulose, latex, copolymers thereof, and combinations thereof.

9. The inkjet coating composition according to claim 1, wherein said binder is selected from the group consisting of polyvinyl alcohol, polyvinylpyrollidone/vinyl acetate copolymer, and combinations thereof.

10. The inkjet coating composition according to claim 1, wherein said binder is present in the coating in an amount ranging from 10–90 parts by weight, based on 100 parts by weight of the coating.

11. The inkjet coating composition according to claim 1, comprising a solids content ranging from 2 to 40% by weight, based on the tot 1 weight of the coating.

12. The inkjet coating composition according to claim 1, wherein said hydrophobic filler comprises one or more particles selected from the group consisting of, precipitated silica, pyrogenic silica, silicates, calcium silicate, aluminum silicate, sodium aluminum silicate, aluminum polysilicate, naturally occurring pigments, synthetic pigments aluminum oxide, clay, benthonite, calcined clay, precipitated calcium carbonate, mica, montmorillonite, kaolinite, asbestos, talc, diatomaceous earth, vermiculite, natural and synthetic zeolites, cement, glass, and combinations thereof.

13. The inkjet coating composition according to claim 1, wherein said hydrophobic filler comprises one or more particles selected from the group consisting of precipitated silica, pyrogenic silica, silicate, calcium silicate, aluminum silicate, sodium aluminum silicate, aluminum polysilicate, and combinations thereof.

14. The inkjet coating composition according to claim 1, wherein said hydrophobic filler comprises one or more particles selected from the group including precipitated silica and pyrogenic silica.

15. An inkjet media, comprising the inkjet coating composition according to claim 1 coated on a substrate.

16. The inkjet media according to claim 15, wherein said substrate is selected from the group consisting of plain paper, resin coated paper, cloth, wood, metal plates, films or sheets of polyester resins, diacetate resins, triacetate resins, acrylic resins, polycarbonate resins, polyvinyl chloride resins, polyimide resins, and combinations thereof.

17. The inkjet media according to claim 15, wherein said substrate is transparent or opaque.

18. A method of inkjet printing, comprising inkjet printing at least one inkjet ink onto a substrate coated with the coating according to claim 1.

19. An inkjet coating composition, comprising:

a hydrophobic filler comprising at least one filler particle and a means for making said particle hydrophobic; and a means for binding said hydrophobic filler, wherein the hydrophobic filler has a carbon content of from 0.1 to 5% by weight.

20. An inkjet media, comprising:

(a) a coating composition, comprising:

(i) a hydrophobic filler comprising at least one filler particle and a means for making said particle hydrophobic, and (ii) a means for binding said hydrophobic filler; and (b) a means for supporting said coating composition in contact with said coating composition, wherein the hydrophobic filler has a carbon content of from 0.1 to 5% by weight.

21. A method for inkjet printing, comprising a step for inkjet printing onto an inkjet media, comprising:

(a) an inket coating composition, comprising:

(i) a hydrophobic filler comprising at least one filler particle and a means for making said particle hydrophobic, and (ii) a means for binding said hydrophobic filler; and (b) a means for supporting said coating composition in contact with said coating composition, wherein the hydrophobic filler has a carbon content of from 0.1 to 5% by weight.

22. The inkjet coating composition according to claim 1, wherein the hydrophobic filler has a carbon content of 0.5 to 2.5% by weight.

23. The inkjet coating composition according to claim 1, wherein the filler has a carbon content of from 0.1 to 1.0% by weight.

24. The inkjet coating composition according to claim 1, wherein the hydrophobic filler has a methanol wettability of from 10 to 20%.

25. The inkjet coating composition according to claim 1, wherein the hydrophobic filler is obtained by homogeneously mixing a silicon oil with particles of at least one filler.

26. The inkjet coating composition of claim 25, wherein the hydrophobic filler is washed free of salt after homogeneously mixing.

27. A coating present on the surface of a substrate, wherein said coating comprises the inkjet coating composition of claim 1.

28. The inkjet coating composition according to claim 1, wherein the hydrophobic filler is a partially hydrophobic filler.

29. The inkjet coating composition according to claim 1, consisting essentially of water, the hydrophobic filler and the binder.

30. The inkjet coating composition according to claim 1, wherein the hydrophobic filler comprises a silicon-containing surface treating agent chemically fixed to a filler particle.

31. The inkjet coating composition according to claim 1, comprising at least one hydrophobic filler selected from the group consisting of a precipitated silica, a pyrogenic silica, and a silicate.

32. The inkjet coating composition according to claim 1, comprising at least one hydrophobic filler comprising a precipitated silica.

33. The inkjet coating composition according to claim 1, comprising at least one hydrophobic filler comprising a pyrogenic silica.

34. The inkjet coating composition according to claim 1, comprising at least one hydrophobic filler comprising a silicate.

35. The inkjet coating composition according to claim 1, wherein the hydrophobic filler is a hydrophobic or a partially hydrophobic precipitated silica.

36. The inkjet coating composition according to claim 1, wherein the hydrophobic filler is a silica obtained by coating a precipitated silica, a pyrogenic silica, a silicate or a synthetic pigment with a silicon oil containing cationic groups.

37. The inkjet coating composition according to claim 36, wherein the silicon oil has quaternary ammonium groups.

38. In an inkjet coating composition comprising at least one hydrophobic filler and a binder, wherein the improvement comprises:

at least one of a hydrophobic precipitated silica, a hydrophobic pyrogenic silica or a hydrophobic silicate surface treated with at least one surface treating agent selected from the group consisting of a silicon oil, a dimethylpolysiloxane, a hexamethyl disilazane, an octamethyl tetrasilane, a trimethoxy octylsilane, a polymethyl siloxane, a polymethyl siloxane emulsion, a trimethyloxyhexadecyl silane, an aminopropyl silane, a vinylsilane, and a methacrylic silane;

and having a carbon content of from 0.1 to 5% by weight.

39. The coating of claim 27, wherein the coating is water absorbent.

* * * * *

UNITED STATES PATENT AND TRADEMARK OFFICE

CERTIFICATE OF CORRECTION

PATENT NO. : 6,840,992 B2
DATED : January 11, 2005
INVENTOR(S) : Holger Glaum et al.

It is certified that error appears in the above-identified patent and that said Letters Patent is hereby corrected as shown below:

Column 17,
Line 34, "tot l" should read -- total --

Column 18,
Line 21, "inket" should read -- inkjet --

Signed and Sealed this

Twenty-fourth Day of May, 2005

JON W. DUDAS
*Director of the United States Patent and Trademark Office*